United States Patent
Cleveland

[11] Patent Number: 5,267,451
[45] Date of Patent: Dec. 7, 1993

[54] EVAPORATING ASSEMBLY

[75] Inventor: David V. Cleveland, Azle, Tex.

[73] Assignee: Valeo Climate Control Corporation, Fort Worth, Tex.

[21] Appl. No.: 918,448

[22] Filed: Jul. 22, 1992

[51] Int. Cl.⁵ .............................................. F25D 17/08
[52] U.S. Cl. ........................................ 62/186; 62/133; 62/158; 165/36; 165/40; 165/108
[58] Field of Search ................. 62/186, 180, 158, 231, 62/177, 178, 133; 165/35, 36, 40, 108

[56]  References Cited
U.S. PATENT DOCUMENTS

| | | | |
|---|---|---|---|
| 1,737,040 | 11/1929 | Bulkeley et al. | 62/186 |
| 2,236,190 | 3/1941 | Wolfert | 165/35 X |
| 2,939,296 | 6/1960 | Coblentz | 62/186 X |

FOREIGN PATENT DOCUMENTS 0043668  1/1982  European Pat. Off.

Primary Examiner—Harry B. Tanner
Attorney, Agent, or Firm—Morgan & Finnegan

[57]  ABSTRACT

An evaporator assembly for incorporation into an air conditioning apparatus, particularly for automobiles, comprises a main air duct (2) defining an air inlet (6) and outlet (10), means (18) to force air through the main air duct (2), a heat exchanger (12) disposed on the main air duct (2), and an air feedback duct (18) which links the main air duct (2) downstream of the heat exchanger (12) with the duct upstream thereof, whereby the proportion of the air which has passed through the heat exchanger can be recirculated, via the feedback duct (18), to pass through a heat exchanger (12).

11 Claims, 2 Drawing Sheets

EVAPORATING ASSEMBLY

BACKGROUND OF THE INVENTION

1. Field of the Invention

The present invention relates to an evaporator assembly apparatus, and in particular, although not exclusively, to an evaporator assembly for incorporation into an air conditioning apparatus for use in automobiles.

2. Discussion of the Prior Art

In automobiles, air conditioning systems are utilised to provide space cooling within a passenger compartment, by introduction of cooled air. The introduced air may be either fresh air from outside the vehicle, or air from within the passenger compartment which has been withdrawn therefrom and cooled by the air conditioning apparatus, or a mixture thereof. A conventional air conditioning apparatus employs an evaporator assembly comprising evaporative heat exchanger consisting of a plurality of tubes through which coolant is passed, mounted in an air duct, and a fan to provide forced passage of air through the duct, which air is cooled on contact with the tubes of the heat exchanger. An example of an air conditioning apparatus which is for use in motor trucks is disclosed in European Patent Application Published No 043668.

Although such a system can operate effectively under conditions of high load such as will exist on initial cooling, the effectiveness of the cooling operation decreases rapidly as the temperatures of the heat exchanger and the inlet air converge. This decline of cooling is particularly dramatic when the inlet air is drawn from the space to be conditioned. This manifests itself as a rapid decline in the refrigerant flow rate after initial switching on of the refrigerating circuit during a peak demand condition. Typically, for a conventional evaporator in an automobile, the flow rate decline may be of the order of 28% after about two and a half minutes, and a further 18% after a further fifteen minutes. Whilst the condensing and pumping components of the heat exchanger circuit can maintain the throughput of refrigerant, the flow rate is limited by the rate of heat transfer of the heat exchanger. There is therefore a need to increase the efficiency of the heat exchanger. Whilst a heat exchanger which is deeper in the direction of air flow will allow a greater rate of heat transfer, the increased dimensions are undesirable; compactness of the heat exchanger, weight and cost thereof are of great importance, particularly for use in automobiles.

Moreover, it can be shown that the quantity of refrigerant charge required in the heat exchanger circuit is that which will satisfy the evaporative heat exchanger under all encountered load and operating conditions, plus an equal volume in the remainder of the circuit, plus a small amount which is required to counteract anticipated leakage from the system. Therefore, if the volume of the evaporator heat exchanger can be reduced, the total quantity of refrigerant required for the system can be reduced by about twice the evaporator heat exchanger volume reduction, further reducing the cost.

It is an object of the invention to provide an air conditioning apparatus which overcomes the problems referred to above, and which is of particularly overall compact design.

SUMMARY OF THE INVENTION

According to the present invention there is provided an evaporator assembly comprising:
- a main air duct defining therein an air inlet, and an air outlet;
- a heat exchanger disposed in the main air duct between the inlet and outlet;
- means to force air through the main duct;
- an air feedback duct linking the duct downstream of the heat exchanger with the duct upstream thereof, arranged whereby a proportion of air which has passed through the heat exchanger can be recirculated through the heat exchanger.

By recirculating a proportion of cooled air back into the main duct, the temperature of air immediately upstream of the heat exchanger is lowered, and the efficiency of cooling is increased. Thus, for a given cooling effect, a heat exchanger which is thinner in the air flow direction than that of a conventional design can be utilised, thereby reducing the size, weight and refrigerant requirement and cost of the air conditioning apparatus.

To compensate for the reduction in volume of the air which is available for final delivery to the automobile interior, the power of the fan must be increased over the conventional design; however, this increase need only be small since the reduced thickness of the heat exchanger offers a reduced resistance to air flow.

Preferably, the assembly further comprises means for selectively closing said air feed back duct.

In a further aspect, the invention resides in a method of operating an evaporator assembly comprising:
- a main air duct defining therein an air inlet, and an air outlet;
- a heat exchanger disposed in the air duct between the inlet and outlet;
- means to force air through the main air duct;
- an air feedback duct which links the main air duct downstream of the heat exchanger with the duct upstream thereof, whereby a proportion of air which has passed through the heat exchanger can be recirculated through the heat exchanger, and means for selectively closing the said air feedback duct;

said method comprising the steps of:
(a) closing said air feedback duct,
(b) operating said means to force the air through the duct, and said heat exchanger, and,
(c) subsequently, opening said means for selectively closing said air feedback duct to cause a proportion of cooled air to be recirculated through the heat exchanger via the feedback duct.

The means for selectively closing the air feedback duct may comprise valve means and control means therefor, adapted to open the air feedback duct after a predetermined period of time from initial operation of the evaporator assembly, or alternatively, to open the air feedback duct once a detected temperature of cooled air has reached a predetermined value.

BRIEF INTRODUCTION TO THE DRAWINGS

An embodiment of the invention is described, by way of example only, with reference to the following drawings, in which.

DESCRIPTION OF THE PREFERRED EMBODIMENT

Figure 2:
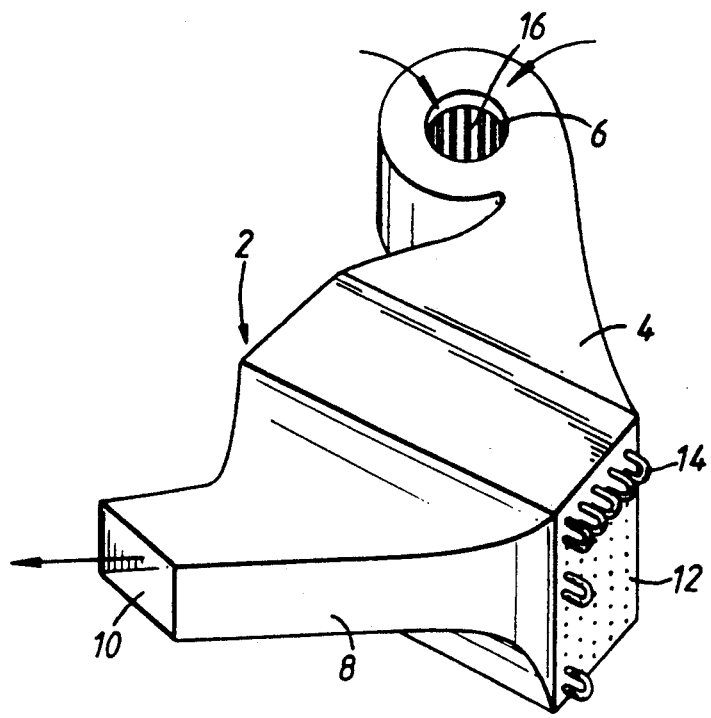
FIG. 2 shows in simplified form a prior art evaporator assembly.

A conventional evaporator assembly for incorporation into an air conditioning system is illustrated, in simplified form, in FIG. 2 of the drawings. FIG. 2 shows a duct 2 comprising duct portions defining an inlet duct 4 having an inlet 6, and an outlet duct 8 having an outlet 10. Inlet duct 4 is arranged for connection to further ducting leading from a position externally of the passenger compartment of the automobile, through which fresh air can be introduced, and/or to ducting connected to the passenger compartment of the vehicle, through which air can be withdrawn from the passenger compartment.

A heat exchanger 12 through which a coolant is circulated is arranged in the duct 2 at a position between the inlet 6 and outlet 10, and includes a plurality of heat exchanger coils, ends 14 of a number of which are shown in FIG. 2. In the example illustrated, five rows of coils in the air flow direction are employed. Each row of coils is contained in a separate transverse plane which is perpendicular to the flow direction through the heat exchanger 12. A fan (not shown in FIG. 2) is arranged immediately upstream of the heat exchanger 12 to force air through the duct 2 to the outlet 10, and into the passenger compartment. This conventional apparatus operates by drawing air externally of the passenger compartment of the vehicle (fresh air) and/or from the passenger compartment itself, which air is cooled on contact with the heat exchanger 12, and then introduced into the passenger compartment.

Figure 1:
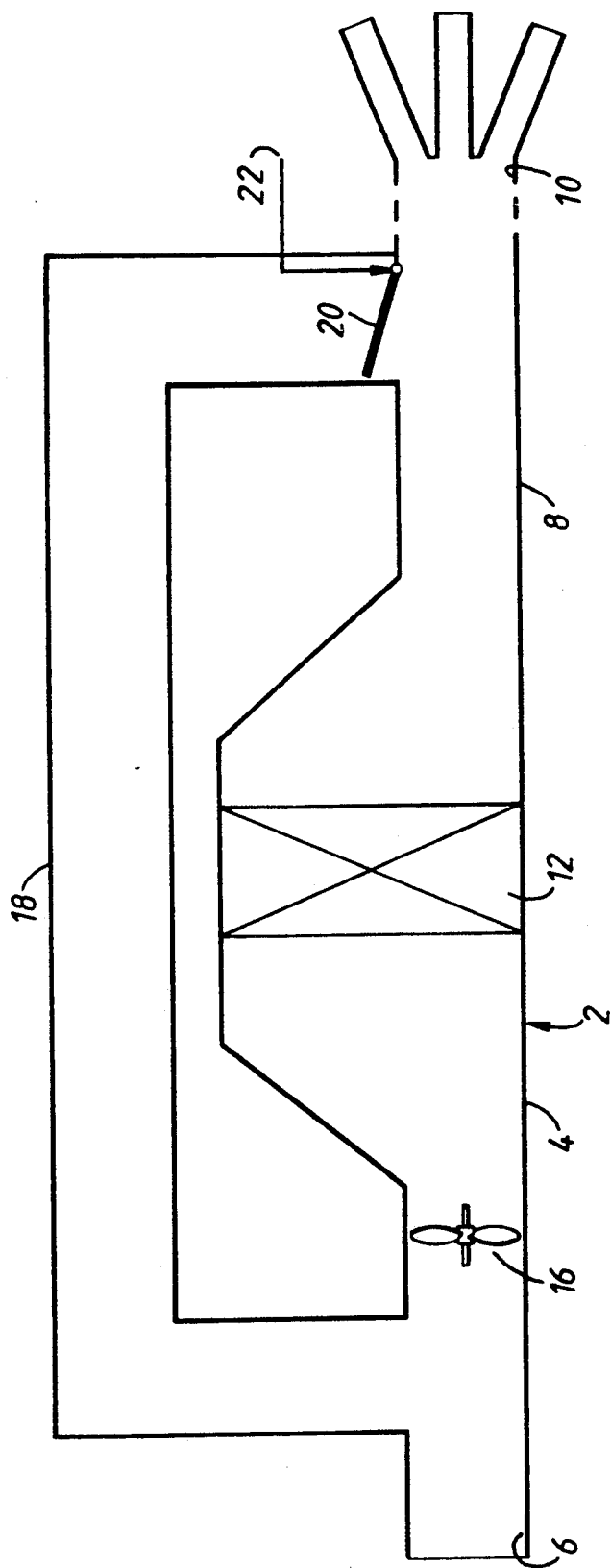
FIG. 1 is a schematic diagram of an air-conditioning apparatus in accordance with the invention.
Figure 3:
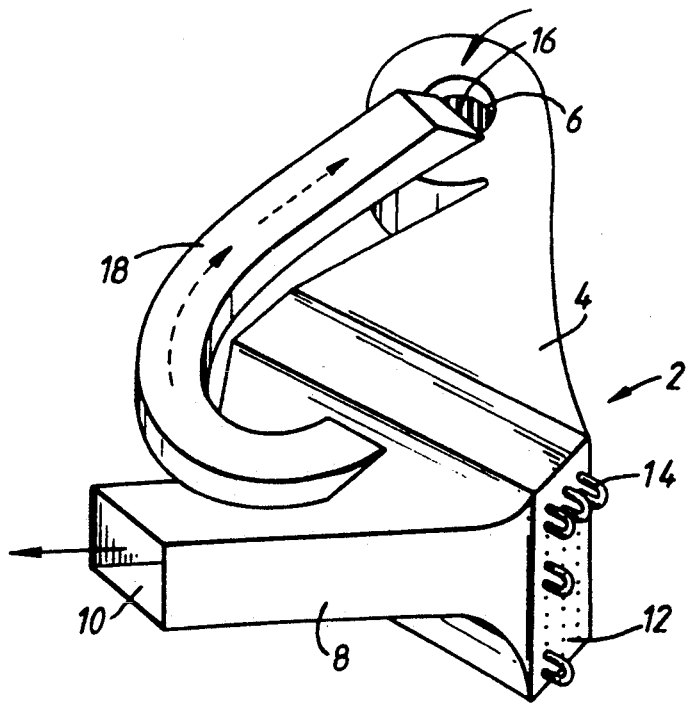
FIG. 3 shows in simplified form the evaporator assembly in accordance with the present invention.

FIGS. 1 and 3 show the air conditioning apparatus in accordance with the invention, those parts in common with the conventional apparatus illustrated in FIG. 2 being denoted by the same reference numerals. Thus, this system includes a duct 2, comprising an inlet duct 4 having inlet 6, and an outlet duct 8 having an outlet 10. A heat exchanger, 12 is disposed between the inlet duct 4 and outlet duct 8. The heat exchanger 12 is an evaporative heat exchanger in which a refrigerant is circulated, which refrigerant is changed from a liquid to gaseous state within the heat exchanger. In use, the heat exchanger 12 is connected to a refrigerant circuit further including, as is conventional,, a compressor, condenser and refrigerant pump. A fan 16 is mounted for rotation in the inlet duct 4 in order to draw air into and through the duct 2 and heat exchanger 12. The fan 16 is driven by an electrically powered motor.

A feedback duct 18 links the outlet duct 8 downstream of the heat exchanger 12 with the inlet duct 4, upstream of the heat exchanger 12. The duct is arranged so that a proportion of air which has passed through the heat exchanger 12 is recirculated via the feedback duct 18 to the inlet duct 4. In FIG. 3 it can be seen that the junction of the feedback duct 18 with the outlet duct 8 is arranged at a sloping face of the outlet duct 8 in order to assist in the division of the air flow. Valve means 20 in the form of, for example, a pivotably mounted vane are provided in the feedback duct 18 at the junction with the outlet duct 8 to allow selective opening and closing of the feedback duct 18, although the valve means 20 may be located elsewhere in the duct, such as at the junction with the inlet duct 4. Control means 22 are provided, to effect opening and closing of the valve means 20.

The evaporator assembly in accordance with the invention is operated as follows. On initial start up of the cooling operation, the valve means 20 is arranged to be in the closed position, closing the feedback duct 18. Air is drawn from outside the automobile or from the passenger compartment into and through the duct 2 and through the heat exchanger 12, which on initial start up, can operate effeciently to give rapid and effective air cooling, the entire throughput of the duct 2 being fed directly to the outlet 10, and to the interior of the passenger compartment. (Where the air inside the passenger compartment has become much warmer than ambient air, which occurs where a vehicle has been left in the sun, merely introducing cooler outside air into the passenger compartment will purge the hot air from the compartment, irrespective of the cooling effect). The control means 22 for the valve means 20 are arranged to open the valve means 20 subsequent to the initiation of cooling. A proportion of the cooled air is thereby allowed to recirculate through the feedback duct 18 to mix with the warmer air in the inlet duct 4, thereby improving the efficiency of the heat exchanger.

The control means 22 may be arranged to operate on a timed sequence, i.e. to open the valve means 20 after a predetermined interval of time, as indicated by a timer 26, or alternatively may be temperature controlled, for example in response to the temperature of air immediately downstream of the evaporator 12, as measured by a temperature sensor 24 (which will generally tend to rise after start up as cooling effectiveness decreases), or alternatively may be arranged to operate on the basis of detected humidity.

The embodiment of the invention employing the feedback duct 18 is able to utilize a heat exchanger 12 of reduced dimensions in the direction of air flow, for a given cooling effect, in comparison with the conventional arrangement of FIG. 2. This is illustrated schematically in FIG. 3, where it should be noted that a row of heat exchanger coils three deep can be utilized, in contrast to the conventional arrangement which requires an array of coils five deep. Thus, the size, weight and cost of the evaporator assembly can be reduced over the conventional arrangement for a giving cooling requirement.

The control means 22 may also be arranged to close the flap 20 on detection of a low fan speed operation and intake of air from outside of the automobile. In such a situation the pressure of air entering the duct, which may be augmented by the movement of the automobile, may exceed the pressure reduction generated by the fan, which draws the air through the duct 2; if the feedback duct 18 was not closed in this state there would be a risk that air would enter the feedback duct 18 upstream of the evaporator, possibly even circulating in the opposite direction to that required.

In a computer model of the air-conditioning apparatus, a heat exchanger employing three rows of coils, and having a face area of 0.63 square feet (0.058 m$^2$) was presented with 390 cubic feet per minute (11.0 m$^3$ min$^{-1}$) of air at 90° F. (32° C.), dry bulb, 75° F. (24° C.), wet bulb. The conditions of the air being passed once through the heat exchanger were determined and 95 cubic feet per minute (2.69m$^3$ min$^{-1}$) of this air blended with 295 cubic feet per minute (2.69m$^3$ min$^{-1}$) of air in the original state, this being fed into the heat exchanger. The total calculated heat transfer was within 2% of that for an air-conditioning apparatus employing a heat exchanger having five rows of heat exchanger coils operated at 295 cubic feet per minute (2.69m$^3$ min$^{-1}$, this being the original air flow rate available for delivery to the air condition space.

What is claimed is:

1. An evaporator assembly comprising:
   a main air duct defining therein an air inlet, and an air outlet;
   a heat exchanger disposed in the main air duct between the inlet and outlet;
   means to force air through the main duct;
   an air feedback duct linking the main duct downstream of the heat exchanger with the duct upstream thereof, arranged whereby a proportion of air which has passed through the heat exchanger can be recirculated through the heat exchanger;
   a valve means disposed in the air feedback duct for opening and closing the air feedback duct; and
   a control means connected to the valve means for selectively opening and closing the air feedback duct wherein, when the rate of temperature decrease of the air in the outlet duct immediately downstream of the heat exchanger is greater than a predetermined value, the control means closes the valve means and air feedback duct, and wherein when the rate of the temperature decrease is equal to or less than the predetermined value, the control means opens the valve means and air feedback duct, and wherein the force imparted to the air by the forcing means is sufficient to compensate for a reduction in the volume or air discharged from the outlet duct downstream of the air feedback duct when the air feedback duct is open to maintain cooling effectiveness.

2. An evaporator assembly according to claim 1, wherein the control means are adapted to open said valve means after a predetermined time interval from initial operation of the evaporator assembly.

3. An evaporator assembly according to claim 1, wherein the control means includes a sensor for detecting the temperature of cooled air in the main duct immediately downstream of the heat exchanger, and opens said valve means when the temperature of cooled air surrounding said sensor drops below a predetermined value.

4. An evaporator assembly according to claim 1, wherein said heat exchanger has a plurality of coils contained in transverse planes which are perpendicular to the air flow through said heat exchanger, said coils being arranged so that no more than three of said transverse planes are defined by said coils.

5. A method of operating an evaporator assembly which comprises:
   a main air duct defining therein an air inlet, and an air outlet;
   a heat exchanger disposed in the main air duct between the inlet and outlet;
   means to force air through the main air duct;
   an air feedback duct which links the main duct downstream of the heat exchanger with the duct upstream thereof, whereby a proportion of air which has passed through the heat exchanger is recirculated to the heat exchanger; and means for selectively closing said air feedback duct;
   said method comprising the steps of:
   (a) closing said air feedback duct as long as the temperature decrease rate of the air in said outlet duct immediately downstream of said heat exchanger is greater than a predetermined value;
   (b) operating said means to force the air through the duct, and said heat exchanger; and
   (c) when the rate of the temperature decrease is equal to or less than the predetermined value, opening said air feedback duct to cause a sufficient proportion of cooled air to be recirculation through the heat exchanger via the feedback duct to compensate for a reduction in the volume of air discharged from the outlet duct downstream of the air feedback duct when the air feedback duct is open to maintain cooling effectiveness.

6. A method according to claim 5, wherein said air feedback duct is opened after a predetermined time interval from initial operation of the evaporator assembly.

7. A method according to claim 4, wherein the evaporator assembly further comprises means for detecting the air temperature in the main duct immediately downstream of the heat exchanger, and said air feedback duct is opened once the detected temperature of cooled air is less than the a predetermined value.

8. A modular evaporator assembly comprising:
   an evaporator heat exchanger having an exchanger outlet;
   an inlet duct leading to said heat exchanger outlet;
   an outlet duct leading away from said heat exchanger;
   a feedback duct mounted on a sloping face of said outlet duct which projects into the elongate region bounded by said exchanger outlet and perpendicular thereto, said feedback duct being generally tangent to said outlet duct at its connection thereto, said feedback duct enabling recirculation of air from said outlet duct to said inlet duct;
   a means to force air in said inlet duct through said heat exchanger into said outlet duct wherein a portion of the air flowing into said outlet duct impinges against said inclined section and flows into said feedback duct; and
   a valve means mounted within said feedback duct to regulate flow therein.

9. An evaporator assembly according to claim 8, wherein the cross section of said outlet duct is symmetrical about its longitudinal axis.

10. An evaporator assembly for an air conditioner of a motor vehicle, the evaporator assembly comprising:
    an evaporative heat exchanger;
    an inlet duct leading to the heat exchanger, said inlet duct being in communication with a portion of the vehicle against which air impinges when the vehicle is driven;
    an outlet duct leading away from the heat exchanger;
    a feedback duct mounted between the outer and inner ducts;
    a means to force air in the inlet duct through the heat exchanger into the outlet duct; and
    a valve means mounted within the feedback duct to regulate recirculation therein from said outlet duct to said inlet duct;
    a control means connected to said valve means, said control means closing said valve means when the vehicle is driven at a sufficient velocity to cause the air pressure in said inlet duct to be sufficiently large to prevent said recirculation through said feedback duct.

11. A method of operating an evaporator assembly according to claim 12 comprising the steps of:
 (a) closing said feedback duct;
 (b) operating said forcing means to force air from said inlet duct through said heat exchanger into said outlet duct;
 (c) opening said valve means to allow a portion of cooled air to be recirculated through said feedback duct from said outlet duct to said inlet duct; and
 (d) closing said valve means when the vehicle is driven sufficiently fast to cause the air pressure in the inlet duct to be sufficiently large to prevent said recirculation through said feedback duct.

* * * * *